United States Patent [19]

Rangel

[11] Patent Number: 5,066,396

[45] Date of Patent: Nov. 19, 1991

[54] TRASH APPARATUS AND COLANDER

[76] Inventor: Ramon A. Rangel, 815 Screenland Dr., Burbank, Calif. 91505

[21] Appl. No.: 127,194

[22] Filed: Dec. 1, 1987

[51] Int. Cl.⁵ .......................................... B01D 35/02
[52] U.S. Cl. .................... 210/236; 210/249; 210/469; 210/474; 209/653; 209/926
[58] Field of Search .............. 220/1 C, 1 T; 209/614, 209/651, 653, 656, 702, 703, 926, 3, 606, 630, 691, 694, 695, 696, 698, 707; 210/249,407, 464, 465, 469, 670, 470, 473, 474, 477, 480, 482, 236, 357, 359, 475, 388, 389; 209/3, 606, 630, 691, 694, 695, 696, 698, 707

[56] References Cited

U.S. PATENT DOCUMENTS

| | | | |
|---|---|---|---|
| 1,073,081 | 9/1913 | Jacobson | 210/465 |
| 2,257,430 | 9/1941 | Sauitz et al. | 210/473 |
| 2,627,863 | 2/1953 | Cavicchioli | 210/477 |
| 2,660,313 | 11/1953 | James | 210/474 |
| 3,157,904 | 11/1964 | Flodell | 209/703 |
| 3,752,320 | 8/1973 | Bira | 210/469 |
| 4,063645 | 12/1977 | Canterman et al. | 209/702 |
| 4,319,762 | 3/1982 | Streit et al. | 210/464 |
| 4,485,927 | 12/1984 | Corsonuir, Jr. | 209/926 |
| 4,632,253 | 12/1986 | Stromgren et al. | 209/926 |
| 4,706,818 | 11/1987 | Zutell et al. | 209/926 |

FOREIGN PATENT DOCUMENTS 1335169 10/1973 United Kingdom ................ 209/926

*Primary Examiner*—Peter Hruskoci
*Assistant Examiner*—Wanda L. Millard
*Attorney, Agent, or Firm*—Frank L. Zugelter

[57] ABSTRACT

An apparatus for separating articles from materials to be trashed, usable in separating food utensils from soiled or used paper products in restaurants, comprising a bin mounted on a frame adapted to seat on a trash barrel or the like, means for collecting the trash mounted in the bin for sliding movement thereoutof, and an upright member mounted in the bin against direction of movement of the collecting means. Such means takes the form of a flat plate which is perforated with a plurality of holes to function as a sieve. As the plate is withdrawn to an extended position outside the bin, the trash drops into its barrel while the utensils, having been previously removed from the bin and put into a compartment formed by the upright member and plate, are not lost in the trashing step. Means are provided to guide the plate in its movement and to prevent it from disengaging from the apparatus.

16 Claims, 3 Drawing Sheets

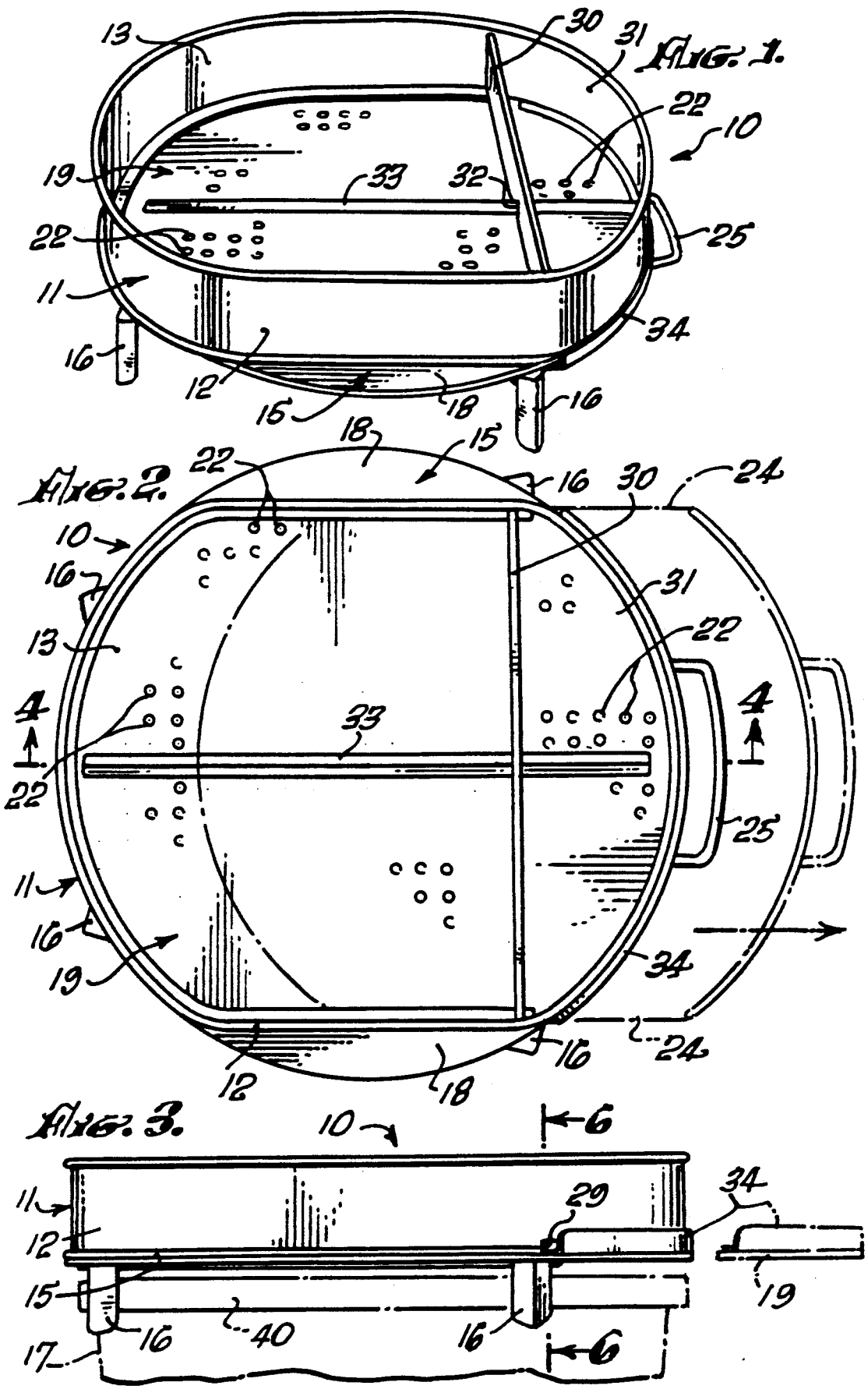

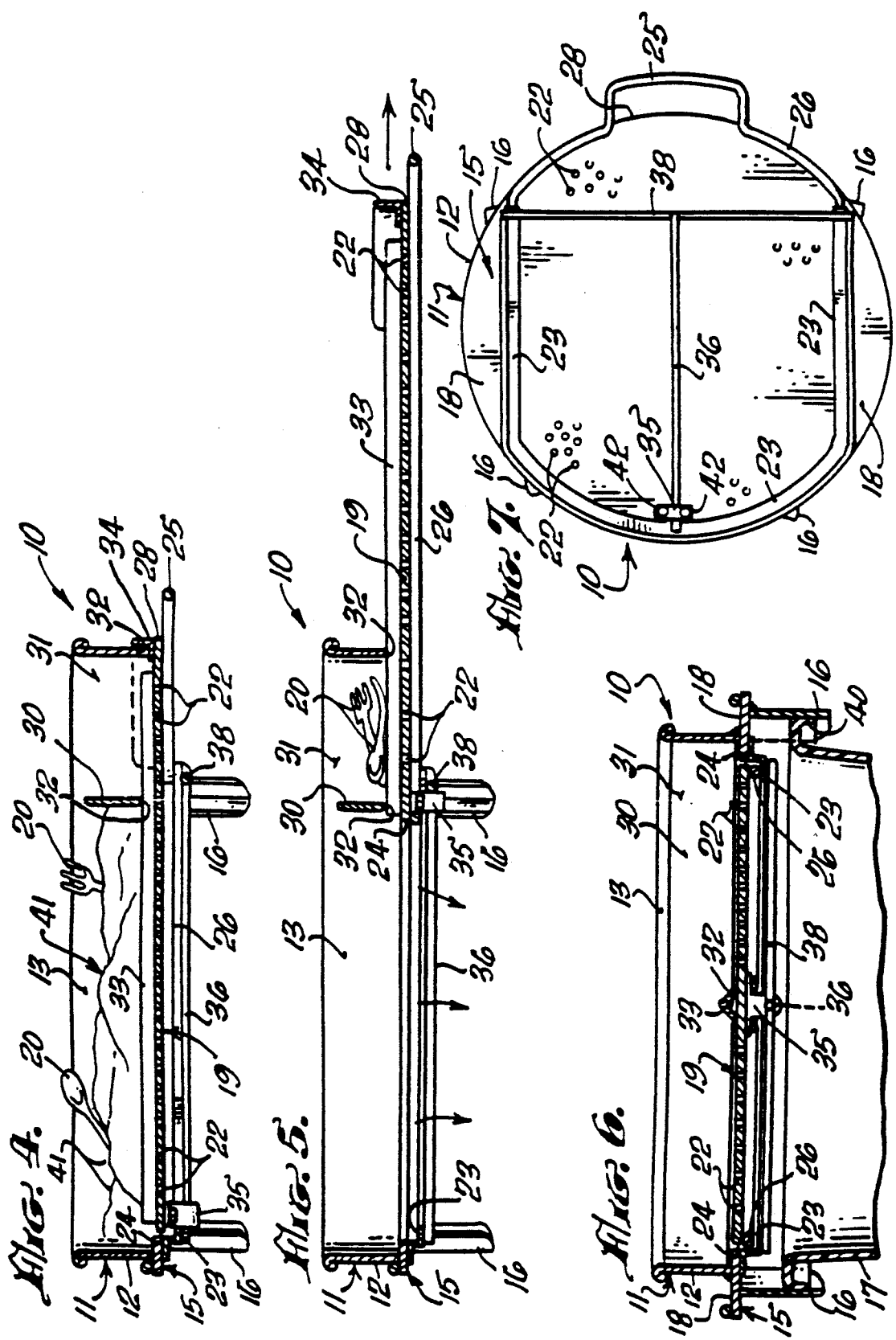

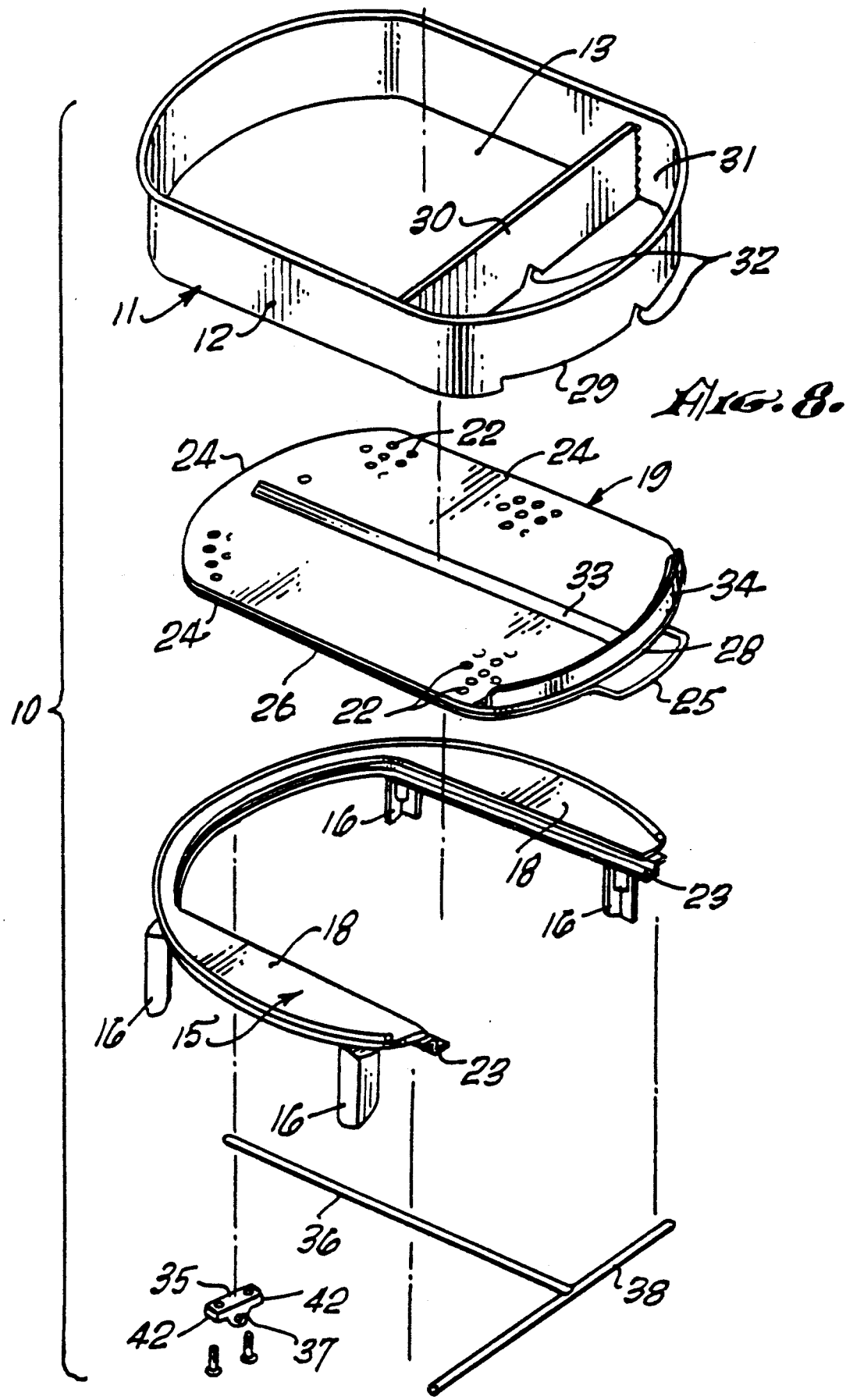

TRASH APPARATUS AND COLANDER

TECHNICAL FIELD

This invention relates to the removal of utensils from a mixture of materials including waste paper products, food leftovers, and liquids, and in particular, relates to an apparatus by which such utensils are so removed or separated while trashing the other materials.

BACKGROUND ART

Disclosures of prior art teachings are found in the following U.S. Pat. Nos.: 2,450,520; 3,436,044; 3,752,320; 3,828,931; 4,049,551; 4,319,762; and 4,452,581.

DISCLOSURE OF THE INVENTION

In the voluminous restaurant business today, the matter of disposing of waste products assumes very large proportions in terms of quantity and limited time and space to accomplish the chore at a given restaurant. Trays or baskets of a mixture of chinaware, utensils, soiled or used paper products, liquids and food leftovers are first removed from patrons' tables, and not particularly sorted out at that point of work. Efforts by visual means is one general way by which utensils or other articles that are to be used over again are separated therefrom. In some restaurant operations, such separation is not made until all is in the kitchen area. Regardless of how loss of utensils occurs, it has increased sufficiently to cause concern in the operational costs of restaurants. Consequently, search for better methods for retaining the utensils while trashing the rest has become a need in the food industry.

The subject matter of this invention provides a quick, expedient manner by which utensils and/or other articles are retained while trashing other materials removed from the tables, without causing immense changes and attendant costs that could be involved in developing other procedures to remove waste products from restaurants, and complements present disposal procedures.

The invention comprises a portable trash apparatus and colander that is readily mounted on a trash receptacle, barrel or the like, and on which there is tossed thereinto whatever is removed from the restaurant proper's tables, in terms of soiled or used paper products, liquids, food leftovers and utensils or other articles. In the operation of the trash apparatus and colander the disposable materials discharge into the trash receptacle after the utensils are separated and retained. Therefore, loss of such utensils is avoided and cost of new utensils is eliminated.

The trash apparatus and colander comprises a bin having a cavity formed by an endless side wall and having an open top and open bottom, a frame to which the bin is securely mounted and on which legs or the like for retaining it upon a trash receptacle or the like depend, a means for collecting disposable materials and utensils, such as a flat plate or an apertured sieve, slidably movable from a position within the cavity of the bin to an extended position beyond it whereby the materials to be trashed discharge into the trash receptacle, and a compartment for retaining utensils while trashing takes place and formed by an upright member separating it from the cavity. Such member is mounted in the bin in a manner against the sliding movement of the collecting means to maintain separation of utensils from such materials while wiping or cleaning takes place of the collecting means during the trashing step over the trash receptacle. As the collecting means slidably moves to its extended position, the utensils having been separated from the disposable materials to be trashed, such materials are prevented from moving with such collecting means which is cleaned as it slides by the upright member and are discharged into the trash receptacle as such means is continued to be moved to its extreme extended position. Means are provided to prevent the collecting means from disengaging from the apparatus. After trash has discharged into the receptacle, the cleaned collecting means is returned to its closed position within the bin for receiving the next batch of materials and utensils dumped and collected thereinto and from which such utensils contained therein are separated first before the materials are discharged into the trash receptacle.

An object of this invention is to provide a unique trash apparatus and colander for the removal in an efficient and expedient manner of utensils from a collection of disposable waste products or materials.

Another object of this invention is to reduce the cost of supplying utensils to a restaurant's operational needs.

A further object of the invention is to provide an inexpensive unit that may be readily employed immediately in present waste removing procedures utilized in a restaurant, without expending large sums of dollars otherwise for assuring that utensils are not lost in such procedures.

These and other objects and advantages of the invention will become more apparent by a complete and full reading of the following description, the appended claims thereto, and the accompanying drawing comprising three (3) sheets.

BRIEF DESCRIPTION OF THE DRAWING

FIG. 1 is a perspective view of the subject matter of the invention.

FIG. 2 is a plan view of FIG. 1, modified in phantom to show an extended position for the sieve.

FIG. 3 is an elevational view of FIG. 2, modified to show its mounting on a trash receptacle or the like.

FIG. 4 is a view taken on line 4—4 of FIG. 2, modified to show a collection of waste materials and utensils in the bin.

FIG. 5 is a modified view of FIG. 4 with the colander's sieve in extended position.

FIG. 6 is a view taken on line 6—6 of FIG. 3.

FIG. 7 is a bottom view of FIG. 1.

FIG. 8 is an exploded perspective view of the FIGURES.

DESCRIPTION OF THE CONTEMPLATED BEST MODE OF THE INVENTION

Referring now to the drawing wherein reference characters correspond to like numerals hereinafter, reference character 10 identifies the trash apparatus and colander. Device 10 comprises a bin 11 formed by an endless vertically-oriented wall 12, of a depth not in excess of access for manual arm and hand penetration, a cavity 13 being generated within such wall 12 between a fully open bottom and open top for the bin 11. Wall 12 is securely mounted to a centrally-open frame 15, such as by welding, while a plurality of spaced depending legs 16 for mounting device 10 upon a trash receptacle 17, FIG. 3, or the like, depend from frame 15. The peripheral positioning of legs 16 on frame 15 corresponds to the size of the opening, usually circular, for receptable 17, while frame 15 preferably includes solid sections 18 which provide a complete covering over receptacle 17 along with a means 19 for collecting waste products or materials and possibly utensils 20, FIG. 4, and other articles in device 10.

Collecting means 19 takes the form of a flat plate, and includes a perforated means such as one of or a plurality of spaced apertures 22 which generate a sieve, and is mounted in a horizontal disposition within and below the top of bin 11, preferably adjacent the bottom of wall 12. Frame 15 includes an inwardly extending lip or flange 23, FIGS. 4 and 6, for seating or mounting the side and rear edge portions 24 of plate 19. A handle 25 is formed from a bead or rod 26 welded to the underside of edge portions 24, such bead or rod 26 providing less physical contact with lip 23 which in turn provides easier sliding movement for plate 19. Handle 25 is disposed outwardly of frontal edge portion 28 of plate 19 and also outside of wall 12, while an elongated thin slot 29, FIG. 8, is provided if necessary at the bottom of wall 12 for the passage of plate 19.

A rigid member 30, its width preferably substantially the same as the depth for bin 11, is uprightly disposed across cavity 13, and is secured to wall 12 in a direction against the sliding movement of collecting means 19, to form a compartment 31 distinct from cavity 13. V-shaped notches 32 are included along member 30's bottom edge and along the bottom of wall 12, FIG. 8, in line with frontal edge portion 28 of plate 19, to cooperatively engage an elongated V-shaped metal member 33 securely mounted atop plate 19 in a direction parallel to its sliding movement. Member 33 guides such collecting means 19 in its withdrawal and insertion movements. An upstanding lip 34 is mounted on frontal edge portion 28 to close off compartment 31 by cooperating with wall 12 in the closed position for collecting means 19. This assists in preventing collected liquids from draining outwardly of device 10 when collecting means 19 includes the feature of apertures 22.

To prevent collecting means 19 from egressing completely out of device 10, a pillow block 35 securely mounted at the distal end of plate 19 depends therefrom to engage a rod 36 by means of an aperture 37, FIG. 8. Rod 36 is aligned with an axis along which plate 19 moves or slides and extends towards frontal edge portion 28 to join a cross-bar 38, the ends of cross-bar 38 and the distal end of rod 36 being correspondingly welded to points along lip 23 of frame 15.

In operation, colander 10 is mounted atop trash receptacle 17 by means of placing its legs 16 about a (usual) collar 40 forming the opening for receptacle 17, FIG. 3. Collecting means 19 is in its closed position in bin 11, and a mixture of waste products or materials 41 to be disposed of and possibly utensils 20 and other articles is dumped thereinto, FIG. 4. These include all kinds of soiled or used paper products, some of which may be cups or other containers with liquid therein, food leftovers, and utensils 20 (knives, forks, spoons). Any such utensils 20 or other articles are visually noted in such mixture, in view of the relative shallowness of bin 11, and manually separated from the remaining materials to be trashed. Such separation may result in utensils 20 being dropped into compartment 31 or perhaps in a utensil tray setting immediately elsewhere in the kitchen environment, such as on the kitcher sink. The result is that cavity 13 is filled but not with any utensils or articles 20. Where a sieve rather than a solid plate functions as collecting means 19, liquids discharge into receptacle 17 through apertures 22. Handle 25 is grasped to withdraw collecting means 19, member 33 guiding it through notches 32. The collection of waste materials strike or jam against member 30 while it wipes clean collecting means 19 as it withdraws. Any utensils 20 remain in compartment 31 as means 19 extends in its withdrawal mode, while communication occurs between cavity 13 and receptacle 17 in order that the waste products discharge through the centrally-opened frame 15 into receptacle 17. After means 19 has reached and is stopped in its extreme extended position by means of block 35 engaging cross-bar 38, it then is reinserted into bin 11, by pushing handle 25 towards wall 12 while elongated metal member 33 guides it back into bin 11 via notches 32.

Assembly of the aforesaid described elements takes place by fabricating and welding together, via state-of-the-art techniques, the variously described elements which are fabricated from suitable metal materials such as iron or steel. Metal is preferably the material to be used in making device 10, as it should have a rugged endurance in view of its operation and treatment during such operation. Rod 36 and cross-bar 38 are welded together initially. The aperture 37 in pillow block 35 is introduced onto rod 36 prior to the welding of rod 36 with that of cross-bar 38 to frame 15. Collecting means 19, with elongated member 33 welded thereto, is introduced into notches 32 of wall 12 and member 30, and thereafter arms 42 on block 35 are riveted, bolted or welded to plate 19 adjacent its distal or rear edge.

Various modifications and changes in construction may be made without departing from the spirit and concept of the invention or its scope as set out in the following appended claims.

I claim:

1. An apparatus for separating a mixture of articles and materials whereby the articles are retained in the apparatus and the materials are disposed of in operation of the apparatus, comprising
   frame means,
   a relatively shallow bin fixedly mounted to said frame means and being formed by an endless wall forming a cavity between an open bottom and an open top for the bin,
   said frame means being distal from said open top and adapted for mounting said apparatus upon a receptacle, and
   slidable plate means for collecting such mixture when disposed in said bin mounted on said frame means substantially at the bottom of such cavity,
   said slidable collecting plate means being slidable on said frame means between a position in alignment with such cavity and an extended position exteriorly of such wall to thereby provide communication between said cavity and receptacle for disposal of such material.

2. The apparatus of claim 1 including
   perforated means formed within said collecting plate means.

3. The apparatus of claim 1 or claim 2 including
   an upright member mounted to and within said bin and over said collecting plate means in a direction against the direction of the sliding movement of said collecting plate means to form a compartment distinct from said cavity and in which retainable articles are accumulatable while wiping clean said collecting plate means in its movement to its extended position.

4. The apparatus of claim 3 including means mounted on said apparatus for guiding the sliding movement of said collecting plate means to and from its extended position.

5. The apparatus of claim 4 including means mounted on said frame and collecting plate means for preventing said collecting plate means from disengaging therefrom.

6. The apparatus of claim 5 wherein said preventing means comprises a rod and cross-bar arrangement securely mounted to said frame means, and a bored lug depending from said collecting plate means, said rod cooperatively engaging said bored lug, whereby the sliding movement of said collecting plate means in its withdrawal mode is terminated in the extreme extended position thereof.

7. The apparatus of claim 3 including means mounted on said frame and collecting plate means for preventing said collecting plate means from disengaging therefrom.

8. The apparatus of claim 7 wherein said preventing means comprises a rod and cross-bar arrangement securely mounted to said frame means, and a bored lug depending from said collecting plate means, said rod cooperatively engaging said bored lug, whereby the sliding movement of said collecting plate means in its withdrawal mode is terminated in the extreme extended position thereof.

9. The apparatus of claim 4 wherein said guiding means comprises aligned V-shaped notches formed in said upright member and wall, and a V-shaped member securely mounted on said collecting plate means in alignment with and cooperatively engaging said V-shaped notches.

10. The apparatus of claim 5 wherein said frame means includes a plurality of spaced legs depending therefrom for mounting on the receptacle 11. The apparatus of claim 1 or claim 2 including means mounted on said apparatus for guiding said collecting plate means in its sliding movement to and from its extended position.

12. The apparatus of claim 11 including means mounted on said frame and collecting plate means for preventing said collecting plate means from disengaging therefrom.

13. The apparatus of claim 12 wherein said preventing means comprises a rod and cross-bar arrangement securely mounted to said frame means, and a bored lug depending from said collecting plate means, said rod cooperatively engaging said bored lug, whereby the sliding movement of said collecting plate means in its withdrawal mode is terminated in the extreme extended position thereof.

14. The apparatus of claim 1 or claim 2 including means mounted on said frame and collecting plate means for preventing said collecting plate means from disengaging therefrom.

15. The apparatus of claim 14 wherein said preventing means comprises a rod and cross-bar arrangement securely mounted to said frame means, and a bored lug depending from said collecting plate means, said rod cooperatively engaging said bored lug, whereby the sliding movement of said collecting plate means in its withdrawal mode is terminated in the extreme extended position thereof.

16. The apparatus of claim 1 or claim 2 wherein said frame means includes a plurality of spaced legs depending therefrom for mounting on the receptable.

* * * * *